(12) United States Patent
Yano (10) Patent No.: US 9,168,957 B2
(45) Date of Patent: Oct. 27, 2015

(54) VEHICLE BODY REAR STRUCTURE

(75) Inventor: Norimasa Yano, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 59 days.

(21) Appl. No.: 14/237,498

(22) PCT Filed: Jul. 30, 2012

(86) PCT No.: PCT/IB2012/001463
§ 371 (c)(1),
(2), (4) Date: Feb. 6, 2014

(87) PCT Pub. No.: WO2013/021247
PCT Pub. Date: Feb. 14, 2013

(65) Prior Publication Data
US 2014/0152054 A1    Jun. 5, 2014

(30) Foreign Application Priority Data
Aug. 10, 2011   (JP) .................................. 2011-175115

(51) Int. Cl.
*B62D 25/20*  (2006.01)
*B62D 25/08*  (2006.01)

(52) U.S. Cl.
CPC .............. *B62D 25/08* (2013.01); *B62D 25/087* (2013.01); *B62D 25/2027* (2013.01); *B62D 25/2036* (2013.01)

(58) Field of Classification Search
CPC .... B60R 13/0861; B62D 25/08; B62D 25/16; B62D 25/20; B62D 25/2027; B62D 25/2036; B62D 27/02
See application file for complete search history.

(56) References Cited

U.S. PATENT DOCUMENTS 4,408,794 A * 10/1983 Harasaki ........................ 296/198
5,102,186 A *  4/1992 Yoshii et al. .............. 296/203.04
5,110,177 A *  5/1992 Akio .......................... 296/187.11
(Continued)

FOREIGN PATENT DOCUMENTS

DE           10026336  A1 * 12/2001   ............. B62D 23/00
DE       102005050960 A1 *  5/2007   ............. B62D 25/08
(Continued)

OTHER PUBLICATIONS

International Search Report Issued Oct. 18, 2012 in PCT/IB12/001463 Filed Jul. 30, 2012.
(Continued)

*Primary Examiner* — Glenn Dayoan
*Assistant Examiner* — Paul Chenevert
(74) *Attorney, Agent, or Firm* — Oblon, McClelland, Maier & Neustadt, L.L.P.

(57) ABSTRACT

A vehicle body rear structure includes an upper back cross-sectional portion which forms a skeleton frame cross member that is elongated in a vehicle width direction, a bracket package tray which is located on a vehicle rear side of the upper back cross-sectional portion and joined to the upper back cross-sectional portion, a roof side inner which is located on a vehicle top side of a wheel house, a roof side outer which is located outside an extended portion and the roof side inner in a vehicle width direction and which has a front end portion which is joined to the upper back cross-sectional portion and a rear end portion which is joined to a bracket package tray, and a bulk connector which couples the roof side outer and the upper back cross-sectional portion.

9 Claims, 10 Drawing Sheets

(56) References Cited

U.S. PATENT DOCUMENTS

| | | | |
|---|---|---|---|
| 5,123,696 A * | 6/1992 | Watari | 296/203.04 |
| 6,010,181 A * | 1/2000 | Robbins et al. | 296/203.04 |
| 6,088,918 A * | 7/2000 | Corporon et al. | 296/203.04 |
| 6,808,228 B1 * | 10/2004 | Campbell et al. | 296/193.02 |
| 6,874,844 B2 * | 4/2005 | Vincenti | 296/203.04 |
| 7,083,225 B2 * | 8/2006 | Yakata et al. | 296/203.04 |
| 7,237,833 B1 * | 7/2007 | Moll | 296/204 |
| 8,789,876 B2 * | 7/2014 | Sera | 296/193.08 |
| 9,010,847 B2 * | 4/2015 | Katou et al. | 296/193.08 |
| 2005/0082878 A1 * | 4/2005 | Yamada et al. | 296/204 |
| 2005/0194818 A1 * | 9/2005 | Odaka et al. | 296/187.12 |
| 2006/0119140 A1 * | 6/2006 | Yamazaki | 296/203.04 |
| 2007/0138837 A1 * | 6/2007 | Tomioka | 296/203.04 |
| 2007/0158977 A1 * | 7/2007 | Yasukouchi et al. | 296/203.04 |
| 2009/0184542 A1 * | 7/2009 | Tsuyuzaki et al. | 296/191 |
| 2010/0072789 A1 * | 3/2010 | Boettcher et al. | 296/209 |
| 2011/0278880 A1 * | 11/2011 | Tsuyuzaki et al. | 296/187.11 |
| 2013/0049392 A1 * | 2/2013 | Kurogi et al. | 296/30 |
| 2013/0088045 A1 * | 4/2013 | Charbonneau et al. | 296/187.12 |
| 2013/0169005 A1 * | 7/2013 | Okamachi et al. | 296/193.08 |
| 2014/0062130 A1 * | 3/2014 | Yoshimura et al. | 296/187.08 |
| 2014/0097640 A1 * | 4/2014 | Chung | 296/187.1 |
| 2015/0042129 A1 * | 2/2015 | Cho et al. | 296/203.04 |

FOREIGN PATENT DOCUMENTS

| | | | | |
|---|---|---|---|---|
| DE | 102008062008 A1 * | 6/2010 | | B62D 25/08 |
| DE | 102009006449 A1 * | 7/2010 | | B62D 25/04 |
| DE | 102011010843 A1 * | 2/2012 | | B62D 25/08 |
| EP | 0 413 158 | 2/1991 | | |
| FR | 2800700 A1 * | 5/2001 | | B62D 25/08 |
| FR | 2926280 A1 * | 7/2009 | | B62D 25/08 |
| FR | 2941670 A1 * | 8/2010 | | B62D 25/02 |
| JP | 1 125281 | 8/1989 | | |
| JP | 6 10079 | 2/1994 | | |
| JP | 2000 6843 | 1/2000 | | |
| JP | 2001 39341 | 2/2001 | | |
| JP | 2002 68017 | 3/2002 | | |
| JP | 2003 312544 | 11/2003 | | |
| JP | 2006 500284 | 1/2006 | | |
| JP | 2007 307993 | 11/2007 | | |
| WO | WO 2005056370 A1 * | 6/2005 | | B62D 25/20 |

OTHER PUBLICATIONS

Japanese Office Action Issued Jun. 14, 2013 in Japanese Patent Application No. 2011-175115 Filed Aug. 10, 2011 (with partial English translation).

* cited by examiner

RELATED ART

VEHICLE BODY REAR STRUCTURE

INCORPORATION BY REFERENCE

The disclosure of Japanese Patent Applications No. 2011-175115 filed on Aug. 10, 2011, including the specification, drawings and abstract is incorporated herein by reference in its entirety.

BACKGROUND OF THE INVENTION

1. Field of the Invention

The present invention relates to a vehicle body rear part structure.

2. Description of Related Art

An upper back structure for a vehicle which includes a pair of strainers, each of which has a lower end portion which is joined to a longitudinal end of a rear floor cross member and an upper end portion that is located on an upper edge of an opening that communicates the cabin with the trunk room, a pair of package tray brackets that are supported by the pair of strainers, and an upper back side panel that are joined to upper end portion of the package tray brackets is disclosed in Japanese Patent Application Publication No. 2003-312544 (JP 2003-312544 A), for example.

In some of upper back structures for a vehicle of this type, the strainers and the upper back side panel are joined to a roof side outer that is located outside, the strainers and the upper back side panel in a vehicle width direction. Examples of related documents that disclose an upper back structure for a vehicle of this type include JP 2003-312544 A, Japanese Patent Application Publication No. 2007-307993 (JP 2007-307993 A), Japanese Patent Application Publication No. 2001-39341 (JP 2001-39341 A), Japanese Utility Model Application Publication No. 6-10079 (JP 6-10079 U), Japanese Patent Application Publication No. 2002-68017 (JP 2002-68017 A) and Japanese Patent Application Publication No. 2000-6843 (JP 2000-6843 A).

However, in such an upper back structure for a vehicle, when a load toward the top of the vehicle is transmitted from a suspension that supports a rear wheel to a suspension tower, the vehicle body undergoes torsional deformation. In such a case, the junction between the roof side outer and the strainers and the junction between the roof side outer and the upper back side panel may undergo deformation which tends to cause separation thereof.

SUMMARY OF THE INVENTION

The present invention has been made in view of the above problem, and provides a vehicle body rear structure that can prevent the junction between a roof side outer and an upper back cross-sectional portion and the junction between a roof side outer and a bracket package tray from undergoing deformation which tends to cause separation thereof.

According to one aspect of the present invention, a vehicle body rear structure is provided which includes a wheel house that is located on one side in a rear of a vehicle and houses a rear wheel; a suspension tower plate that is coupled to the wheel house and supports an upper end portion of a suspension which supports the rear wheel; an upper back cross-sectional portion that is located inside an extended portion which extends toward a top of the vehicle from the wheel house in a vehicle width direction and forms a skeleton frame cross member that is elongated in a vehicle width direction; a bracket package tray that is located inside the extended portion in a vehicle width direction and on a vehicle rear side of the upper back cross-sectional portion and has a front end portion which is joined to the upper back cross-sectional portion; a roof side inner that is located on a vehicle top side of the extended portion and has a lower end portion which is joined to an upper end portion of the extended portion; a roof side outer that is located outside the extended portion and the roof side inner in a vehicle width direction and which has a lower end portion which is joined to the wheel house, a front end portion which is joined to the upper back cross-sectional portion and a rear end portion which is joined to the bracket package tray; and a bulk connector that couples the roof side outer and the upper back cross-sectional portion.

According to a vehicle body rear structure, the roof side outer and the upper back cross-sectional portion are coupled by the bulk. Thus, even when a load toward the top of the vehicle is transmitted from a suspension that supports a rear wheel to a suspension tower and the vehicle body undergoes torsional deformation, the upper back cross-sectional portion is prevented from being pulled inward in a vehicle width direction. This prevents the junction between the roof side outer and the upper back cross-sectional portion and the junction between the roof side outer and the bracket package tray from undergoing deformation which tends to cause separation thereof.

Especially, because the roof side outer and the upper back cross-sectional portion are coupled by the bulk, the junction between the roof side outer and the upper back cross-sectional portion is prevented from undergoing deformation which tends to cause separation thereof more effectively.

In the vehicle body rear structure, the bulk may couple the roof side outer with at least one of the extended portion and the roof side inner at a location between a junction which is located between the front end portion and the rear end portion of the roof side outer and at which the bulk and the upper back cross-sectional portion are joined and a junction where the rear end portion of the roof side outer and the bracket package tray are joined.

According the vehicle body rear structure, the roof side outer and at least one of the extended portion and the roof side inner are coupled by the bulk at a location closer to the junction where the rear end portion of the roof side outer and the bracket package tray are joined. This also prevents the junction between the roof side outer and the bracket package tray from undergoing deformation which tends to cause separation thereof more effectively.

In the vehicle body rear structure, the roof side outer may have a front wall portion and a rear wall portion that are arranged in a vehicle length direction, and a connecting wall portion which couples the front wall portion and the rear wall portion. The bulk may have a front coupling portion that is joined to the front wall portion, a rear coupling portion that is joined to the rear wall portion, an outer coupling portion that is joined to the connecting wall portion, and an inner coupling portion that has a front portion which is joined to the upper back cross-sectional portion and a rear portion which is joined to at least one of the extended portion and the roof side inner.

According to the vehicle body rear structure, when a load toward the top of the vehicle is transmitted from a suspension that supports a rear wheel to a suspension tower and the vehicle body undergoes torsional deformation, a shearing load acts on the junction between the front wall portion of the roof side outer and the front coupling portion of the bulk and the junction between the rear wall portion of the roof side outer and the rear coupling portion of the bulk. Thus, the load which tends to cause separation of the junction between the roof side outer and the upper back cross-sectional portion and the junction between the roof side outer and the bracket package tray can be reduced. This prevents these junctions from undergoing deformation which tends to cause separation thereof more effectively.

In the vehicle body rear structure, the front coupling portion and the rear coupling portion may extend in opposite directions along a vehicle height direction. The outer coupling portion and the inner coupling portion may extend in opposite directions along a vehicle height direction.

According to a vehicle body rear structure, the front wall portion and the rear wall portion extend in opposite directions along a vehicle height direction. Thus, the spot welding gun is prevented from interfering with the rear coupling portion when the front wall portion and the front coupling portion are joined by spot welding. In addition, the spot welding gun is prevented from interfering with the front coupling portion when the rear wall portion and the rear coupling portion are joined by spot welding.

Similarly, the outer coupling portion and the inner coupling portion extend in opposite directions along a vehicle height direction. Thus, the spot welding gun is prevented from interfering with the inner coupling portion when the connecting wall portion and the outer coupling portion are joined by spot welding, and the spot welding gun is prevented from interfering with the outer coupling portion when the upper back cross-sectional portion or at least one of the extended portion and the roof side inner is joined to the inner coupling portion by spot welding. This improves the work efficiency during the spot welding processes.

In the vehicle body rear structure, the front coupling portion, the rear coupling portion, the outer coupling portion and the inner coupling portion may all extend toward a bottom of the vehicle and may be joined to each other to form an annular configuration.

According to a vehicle body rear structure, the coupling portions of the bulk are joined to each other to form an annular configuration. This configuration can improve the rigidity of the bulk and allows reduction of the thickness of the bulk.

In the vehicle body rear structure, the inner coupling portion may have an opening, which is a notch or hole, and at least one of welding points at which the extended portion and the upper back cross-sectional portion are joined by spot welding may be a welding point that is formed by spot welding through the opening.

According to a vehicle body rear structure, the number of welding points between the extended portion and the upper back cross-sectional portion is increased because the extended portion and the upper back cross-sectional portion are joined by spot welding through the opening of the inner coupling portion. This improves the coupling strength between the extended portion and the upper back cross-sectional portion.

In the vehicle body rear structure, the front end portion and the rear end portion of the roof side outer may be joined to the roof side inner, and the roof side outer may have an upper end portion which is located on a vehicle bottom side compared to an upper end portion of the roof side inner and is not joined to the upper end portion of the roof side inner.

According to the vehicle body rear structure, the upper end portion of the roof side outer is located on the vehicle bottom side compared to the upper end portion of the roof side inner and is not joined to the upper end portion of the roof side inner. Thus, when a load toward the top of the vehicle is transmitted from a suspension that supports a rear wheel to the suspension tower and the vehicle body undergoes torsional deformation and when the roof side inner undergoes torsional deformation which tends to displace the upper end portion thereof outward in a vehicle width direction, the torsional deformation of the roof side inner is prevented from being transmitted to the upper back cross-sectional portion via the roof side outer. This prevents the junction between the roof side outer and the upper back cross-sectional portion and the junction between the roof side outer and the bracket package tray from undergoing deformation which tends to cause separation thereof more effectively.

As described in detail above, according to the present invention, the junction between the roof side outer and the upper back cross-sectional portion and the junction between the roof side outer and the bracket package tray are prevented from undergoing deformation which tends to cause separation thereof.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Description is hereinafter made of one embodiment of the present invention with reference to the drawings. The arrow UP, arrow FR and arrow OUT that are shown in the drawings indicate the upper side in a vehicle height direction, the front side in a vehicle length direction, and the outer side (right side) in a vehicle width direction, respectively.

Figure 1:
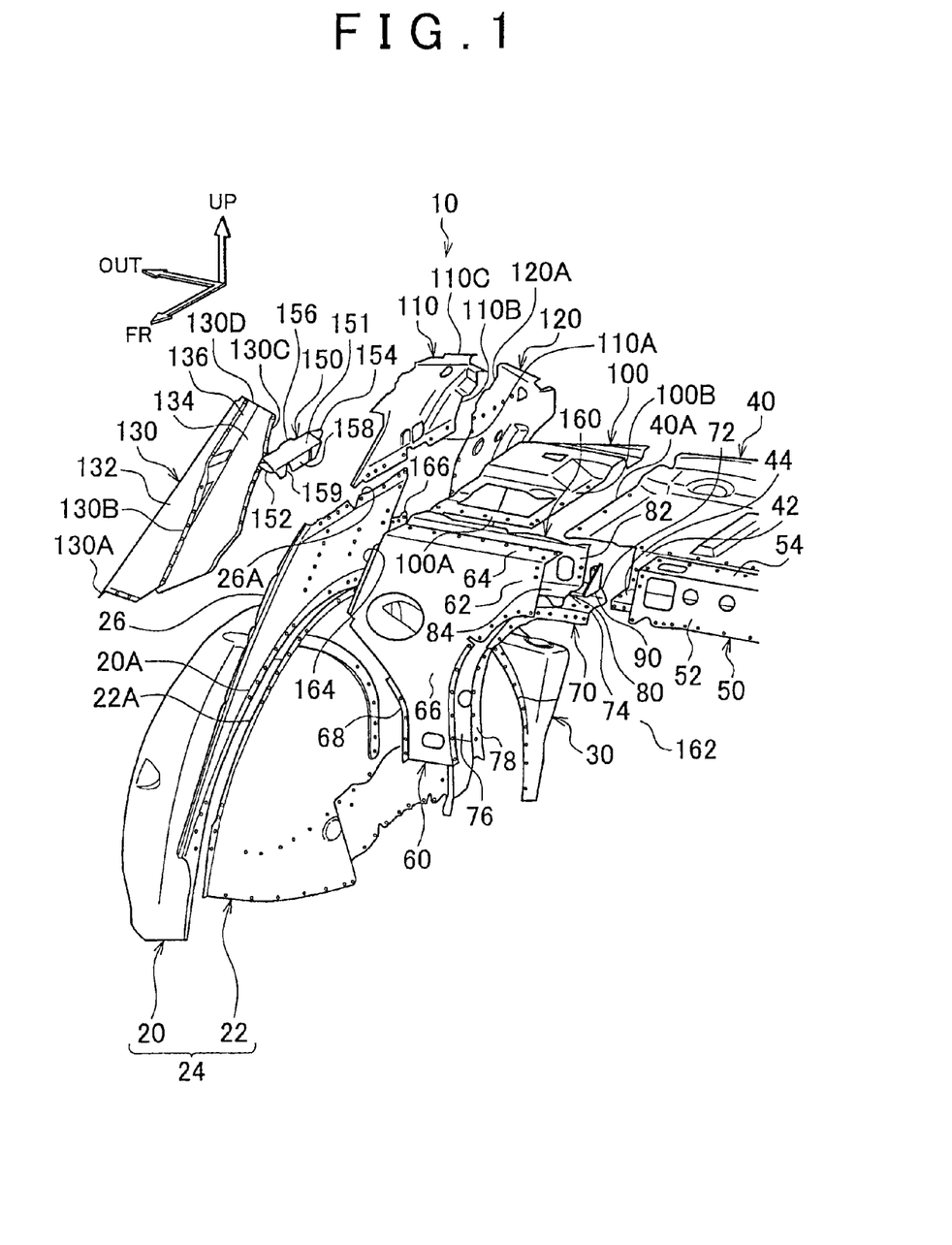
FIG. 1 is an exploded perspective view of a vehicle body rear structure according to one embodiment of the present invention.

As shown in FIG. 1, a vehicle body rear structure 10 according to one embodiment of the present invention includes a wheel house outer 20, a wheel house inner 22, a suspension tower plate 30, an upper back 40, an upper back outer 50, a strainer front 60, a strainer rear 70, a bracket package tray reinforcement 80, an upper back reinforcement 90; a bracket package tray 100, a roof side inner 110, a roof side inner rear 120, a roof side outer 130, a suspension tower gusset 140 (refer to FIG. 2), and a bulk connector 150.

The wheel house outer 20 and the wheel house inner 22 are located on one side in the rear of the vehicle and divided in a vehicle width direction. The wheel house outer 20 and the wheel house inner 22 are joined to each other along their peripheral portions 20A and 22A by spot welding to form a dome-shaped wheel house 24 which houses a rear wheel (not shown).

Figure 2:
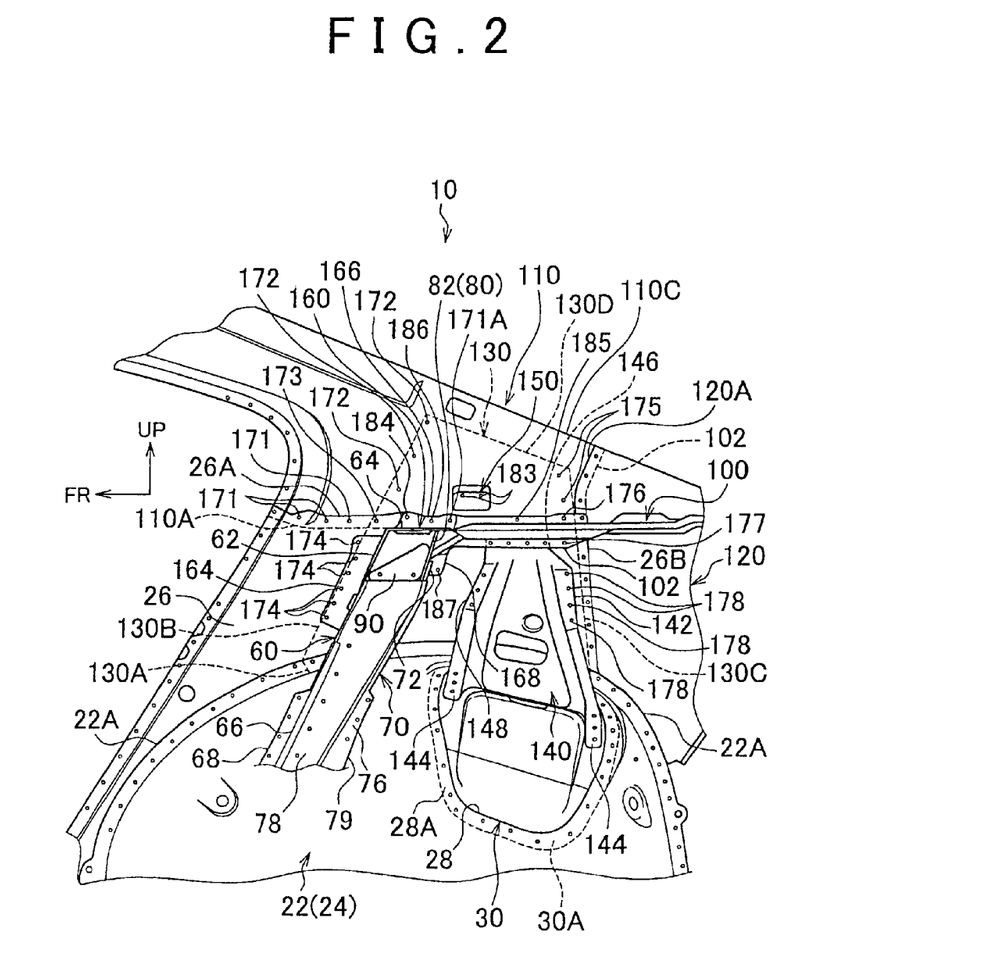
FIG. 2 is a diagram of the vehicle body rear structure that is shown in FIG. 1 as seen from inside in a vehicle width direction.

The wheel house outer 20, which constitutes the wheel house 24, has an extended portion 26 that is formed integrally therewith and extends toward the top of the vehicle. The extended portion 26 is formed in a plate-like configuration with its thickness direction oriented in a vehicle width direction. The wheel house inner 22 has an opening 28 at a location that is slightly offset from its top toward the rear of the vehicle as shown in FIG. 2.

The suspension tower plate 30 has a peripheral portion 30A which is joined to a peripheral portion 28A of the opening 28 by spot welding, whereby the suspension tower plate 30 is assembled to the wheel house 24. The suspension tower plate 30 supports an upper end portion of a suspension (not shown) that supports a rear wheel (not shown).

As shown in FIG. 1, the upper back 40 is formed in a plate-like configuration with its thickness direction oriented in a vehicle height direction. The upper back 40 extends in a vehicle width direction across the center of the vehicle body in a vehicle width direction, and is formed in an elongated configuration with its longitudinal direction oriented in a vehicle width direction. The upper back 40 has a rear wall portion 42 that extends from a front end portion thereof toward the bottom of the vehicle to form a rear wall of an upper back cross-sectional portion 160, which is described later, and a lower wall portion 44 that extends from a lower end portion of the rear wall portion 42 toward the front of the vehicle.

The upper back outer 50 is located on the vehicle front side of the upper back 40. The upper back outer 50 is formed in an elongated configuration with its longitudinal direction oriented in a vehicle width direction, and has a front wall portion 52 which faces the rear wall portion 42, which is described above, in a vehicle width direction and forms a front wall of an upper back cross-sectional portion 160, which is described later, and an upper wall portion 54 which faces the lower wall portion 44, which is described above, in a vehicle height direction. The front wall portion 52 has a lower end portion which is joined to a front end portion of the lower wall portion 44 by spot welding, and the upper wall portion 54 has a rear end portion which is joined to an upper end portion of the rear wall portion 42 by spot welding.

The strainer front 60 has a front wall portion 62 and an upper wall portion 64 which are arranged continuously in a vehicle width direction from the front wall portion 52 and the upper wall portion 54, respectively. The strainer front 60 has a front leg portion 66 that extends from the front wall portion 62 toward the bottom of the vehicle. The front leg portion 66 has a flange 68 that extends from an outer end portion thereof in a vehicle width direction toward the front of the vehicle, and the flange 68 is joined to the wheel house inner 22 by spot welding.

The strainer rear 70 is located on the vehicle rear side of the strainer front 60. The strainer rear 70 has a rear wall portion 72 and a lower wall portion 74 which are arranged continuously in a vehicle width direction from the rear wall portion 42 and the lower wall portion 44, respectively. The strainer rear 70 also has a rear leg portion 76 and an inner leg portion 78 which extend toward the bottom of the vehicle from the rear wall portion 72 and the lower wall portion 74, respectively.

The lower wall portion 74 has a front end portion which is joined to a lower end portion of the front wall portion 62, and the inner leg portion 78 has a front end portion which is joined to an inner end portion of the front leg portion 66 in a vehicle width direction. The rear leg portion 76 has a flange 79 that extends from an outer end portion thereof in a vehicle width direction toward the rear of the vehicle, and the flange 79 is joined to the wheel house inner 22 by spot welding as shown in FIG. 2.

The bracket package tray reinforcement 80 is located on the vehicle rear side of the strainer front 60 and on the vehicle upper side of the strainer rear 70 as shown in FIG. 1. The bracket package tray reinforcement 80 has a rear wall portion 82 and a lower wall portion 84 which are arranged continuously in a vehicle width direction from the rear wall portion 42 and the lower wall portion 44, respectively.

The rear wall portion 82 has an upper end portion which is joined to a rear end portion of the upper wall portion 64 and a front end portion 100A of the bracket package tray 100, which is described later, in an overlapping relationship in a vehicle height direction by spot welding. The rear wall portion 82 is overlapped with the rear wall portion 72 from the vehicle front side and joined thereto by spot welding, and the lower wall portion 84 is overlapped with the lower wall portion 74 from the vehicle top side and joined thereto by spot welding. The rear wall portion 82 and the lower wall portion 84 are coupled by the upper back reinforcement 90.

Each of the rear wall portions 72 and 82 has an inner end portion in a vehicle width direction which is joined to an outer end portion of the rear wall portion 42 in a vehicle width direction by spot welding, and each of the lower wall portions 74 and 84 has an inner end portion in a vehicle width direction which is joined to an outer end portion of the lower wall portion 44 in a vehicle width direction by spot welding. The front wall portion 62 has an inner end portion in a vehicle width direction which is joined to an outer end portion of the front wall portion 52 in a vehicle width direction by spot welding.

The rear wall portions 42, 72 and 82, the lower wall portions 44, 74 and 84, the front wall portions 52 and 62, and the upper wall portions 54 and 64 constitute the upper back cross-sectional portion 160. The upper back cross-sectional portion 160 is located inside the extended portion 26 in a vehicle width direction, and forms a skeleton frame cross member that is elongated in a vehicle width direction.

The lower wall portions 44 and 74 and the front wall portion 52 of the upper back outer 50, the strainer front 60, the strainer rear 70 and the bracket package tray reinforcement 80, which are coupled to each other as described above, form an opening 162 that communicates a cabin (not shown) with a trunk room (not shown).

The bracket package tray 100 is formed in a plate-like configuration with its thickness direction oriented in a vehicle height direction. The bracket package tray 100 is formed in an elongated configuration with its longitudinal direction oriented in a vehicle length direction, and located between the extended portion 26 of the wheel house outer 20 and the upper back 40 in a vehicle width direction.

The bracket package tray 100 is located on the vehicle rear side of the upper back cross-sectional portion 160, and has a front end portion 100A which is joined to an upper end portion of the rear wall portion 82 and a rear end portion of the upper wall portion 64 by spot welding as described above. The bracket package tray 100 has an inner end portion 100B in a vehicle width direction which is joined to an outer end portion 40A of the upper back 40 in a vehicle width direction by spot welding.

The roof side inner 110 is located on the vehicle top side of the extended portion 26. The roof side inner 110 has a lower end portion 110A which has a front portion which is joined to an upper end portion 26A of the extended portion 26 by spot welding at a plurality of welding points 171 as shown in FIG. 2.

The roof side inner rear 120 is located on the vehicle rear side of the roof side inner 110. The roof side inner rear 120 has a front end portion 120A which is joined to a rear end portion 110B of the roof side inner 110, a rear end portion 26B of the extended portion 26, and rear end portions of the peripheral portions 20A and 22A of the wheel house outer 20 and the wheel house inner 22 (refer to FIG. 1) by spot welding. A side outer panel (not shown) is provided outside the roof side inner rear 120, the roof side inner 110, the extended portion 26, and the roof side outer 130, which is described later, in a vehicle width direction.

As shown in FIG. 1, the roof side outer 130 is located outside the extended portion 26 and the roof side inner 110 in a vehicle width direction. The roof side outer 130 has a lower end portion 130A which is joined to the wheel house outer 20 by spot welding as shown in FIG. 3.

Figure 3:
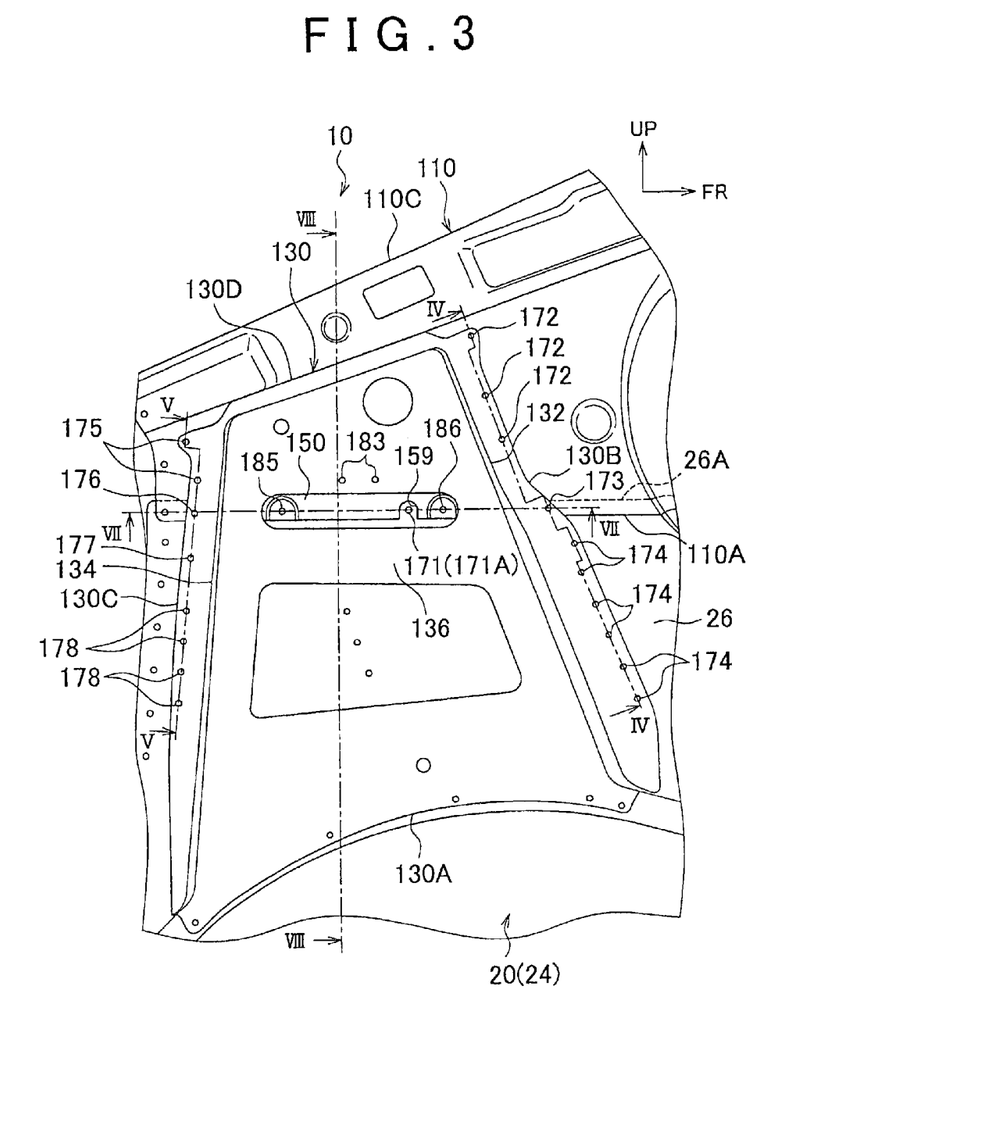
FIG. 3 is a diagram of the vehicle body rear structure that is shown in FIG. 1 as seen from outside in a vehicle width direction.
Figure 4:
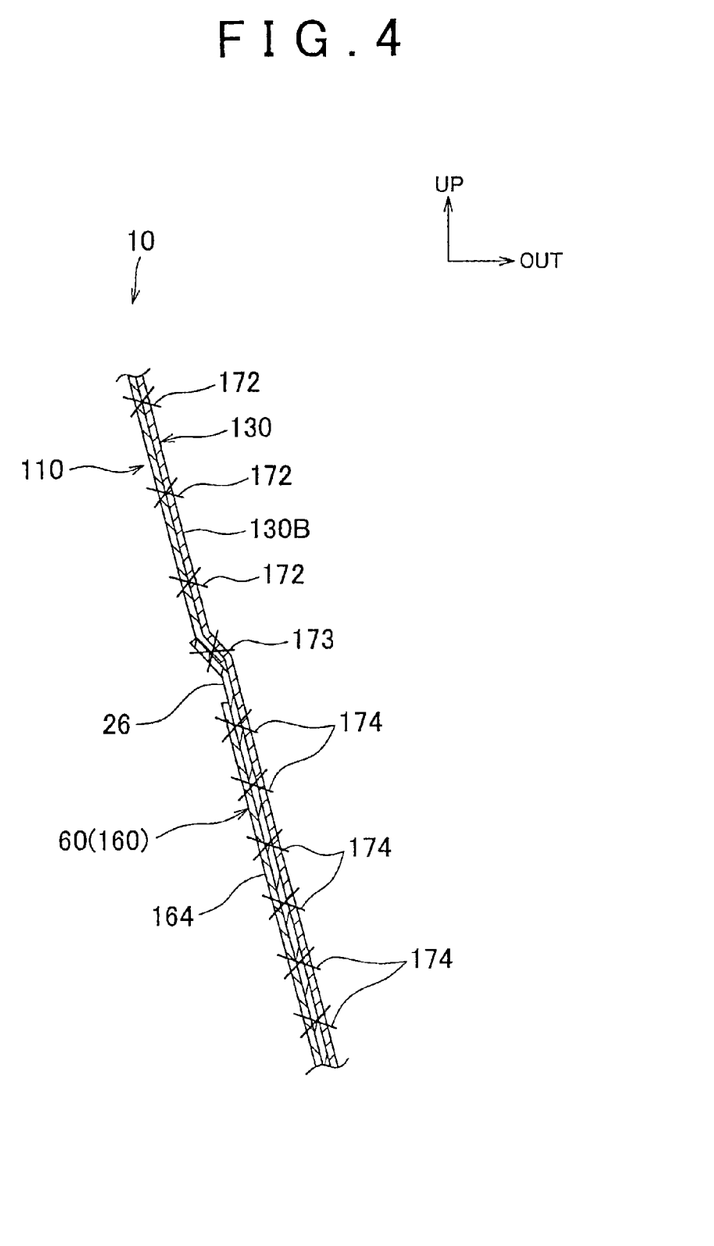
FIG. 4 is a cross-sectional view that is taken along the line 4-4 of FIG. 3.

As shown in FIG. 3 and FIG. 4, the roof side outer 130 has a front end portion 130B which has an upper portion which is joined to the roof side inner 110 by spot welding at welding points 172, and an intermediate portion in a vehicle height direction which is joined, to the extended portion 26 and the roof side inner 110 by spot welding at a welding point 173.

As shown in FIG. 2, the upper back cross-sectional portion 160 (the strainer front 60) has a flange 164 that extends from an outer end portion thereof in a vehicle width direction toward the front of the vehicle and is elongated in a vehicle height direction, and the front end portion 130B of the roof side outer 130 has a lower portion which is joined to the flange 164 and the extended portion 26 by spot welding at welding points 174 (refer to also FIG. 4).

Figure 5:
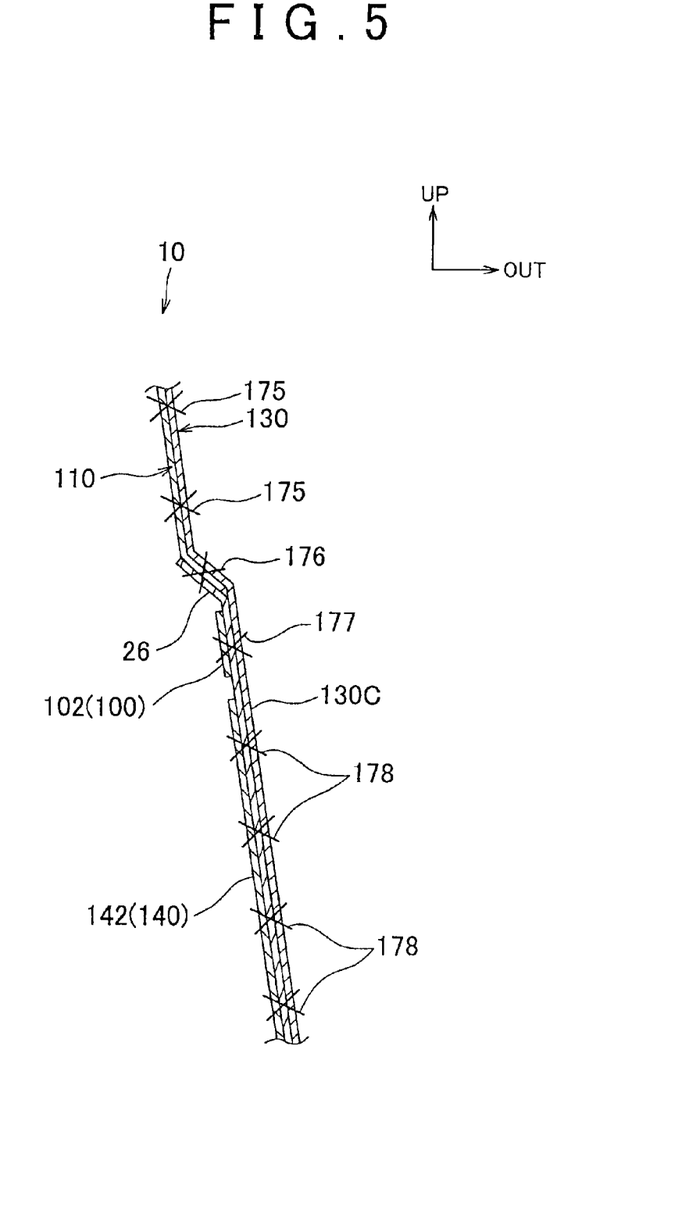
FIG. 5 is a cross-sectional view that is taken along the line 5-5 of FIG. 3.

As shown in FIG. 3 and FIG. 5, the roof side outer 130 has a rear end portion 130C which has an upper portion which is joined to the roof side inner 110 by spot welding at welding points 175, and an intermediate portion in a vehicle height direction that has an upper side which is joined to the extended portion 26 and the roof side inner 110 by spot welding at a welding point 176.

As shown in FIG. 2, the bracket package tray 100 has a flange 102 that extends from an outer end portion thereof in a vehicle width direction toward the bottom of the vehicle and is elongated in a vehicle length direction, and the rear end portion 130C has an intermediate portion in a vehicle height direction that has a lower side which is joined to the extended portion 26 and the flange 102 by spot welding at a welding point 177 (refer also FIG. 5). The welding point 177 is one example of the "junction where a rear end portion of a roof side outer and a bracket package tray are joined" in the present invention, and is located on the vehicle rear side compared to the upper back cross-sectional portion 160 and on the vehicle top side of a plurality of welding points 178, which are described later.

As shown in FIG. 2, the suspension tower gusset 140 has a flange 142 that extends in a vehicle height direction from a vehicle rear side end thereof, and the rear end portion 130C has a lower portion which is joined to the extended portion 26 and the flange 142 by spot welding at a plurality of welding points 178 (refer also FIG. 5).

The suspension tower gusset 140 is located between the suspension tower plate 30 and the bracket package tray 100 in a vehicle height direction as shown in FIG. 2. The suspension tower gusset 140 has flanges 144 that are formed at a lower end portion thereof and joined to the suspension tower plate 30 by spot welding, and a flange 146 that is formed at an upper end portion thereof and joined to the flange 102, which is formed at a vehicle bottom side end of the bracket package tray 100, by spot welding.

The suspension tower gusset 140 has a flange 148 that extends in a vehicle height direction from a vehicle front side end thereof and is joined to the extended portion 26 by spot welding.

Figure 6:
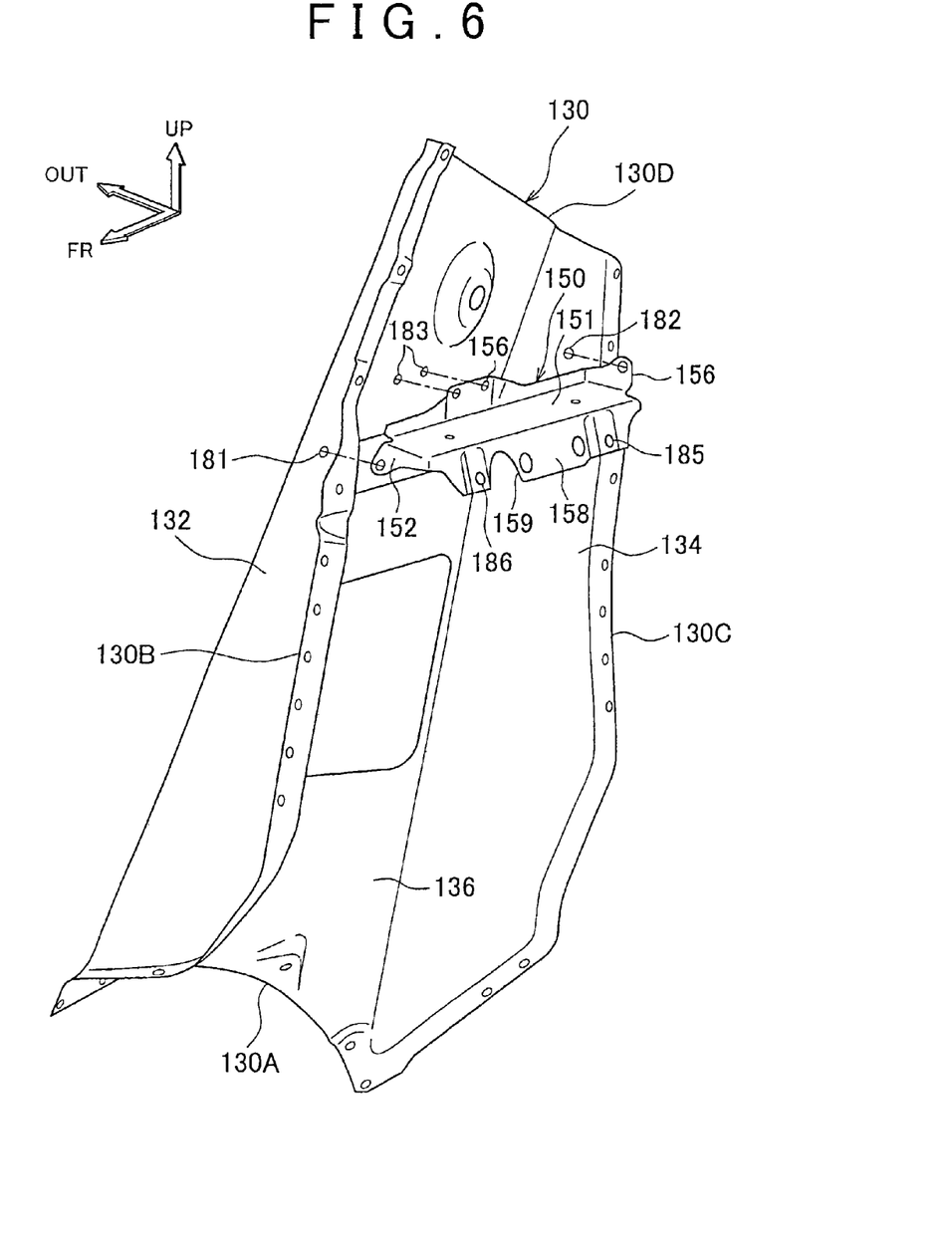
FIG. 6 is an exploded perspective view of a roof side outer and a bulk that are shown in FIG. 1.

As shown in FIG. 6, the roof side outer 130, more specifically, has a front wall portion 132 and a rear wall portion 134 which are arranged in a vehicle length direction, and a connecting wall portion 136 which couples the front wall portion 132 and the rear wall portion 134.

The bulk 150 couples the roof side outer 130, the upper back cross-sectional portion 160 and the bracket package tray 100 (refer to FIG. 1). The bulk 150, more specifically, has a main body portion 151, a front coupling portion 152, a rear coupling portion 154, an outer coupling portion 156, and an inner coupling portion 158.

The main body portion 151 extends in an elongated manner in a vehicle length direction with its thickness direction oriented in a vehicle height direction. The front coupling portion 152 extends from a front end portion of the main body portion 151 toward the bottom of the vehicle, and the rear coupling portion 154 extends from a rear end portion of the main body portion 151 toward the top of the vehicle. In other words, the front coupling portion 152 and the rear coupling portion 154 extend in opposite directions along a vehicle height direction.

The outer coupling portion 156 extends from an outer end portion of the main body portion 151 in a vehicle width direction toward the top of the vehicle, and the inner coupling portion 158 extends from an inner end portion of the main body portion 151 in a vehicle width direction toward the bottom of the vehicle. In other words, the outer coupling portion 156 and the inner coupling portion 158 extend in opposite directions along a vehicle height direction.

As shown in FIG. 6, the front coupling portion 152 is joined to the front wall portion 132 by spot welding at a welding point 181, and the rear coupling portion 154 is joined to the rear wall portion 134 by spot welding at a welding point 182. The outer coupling portion 156 is joined to the connecting wall portion 136 by spot welding at welding points 183.

Figure 7:
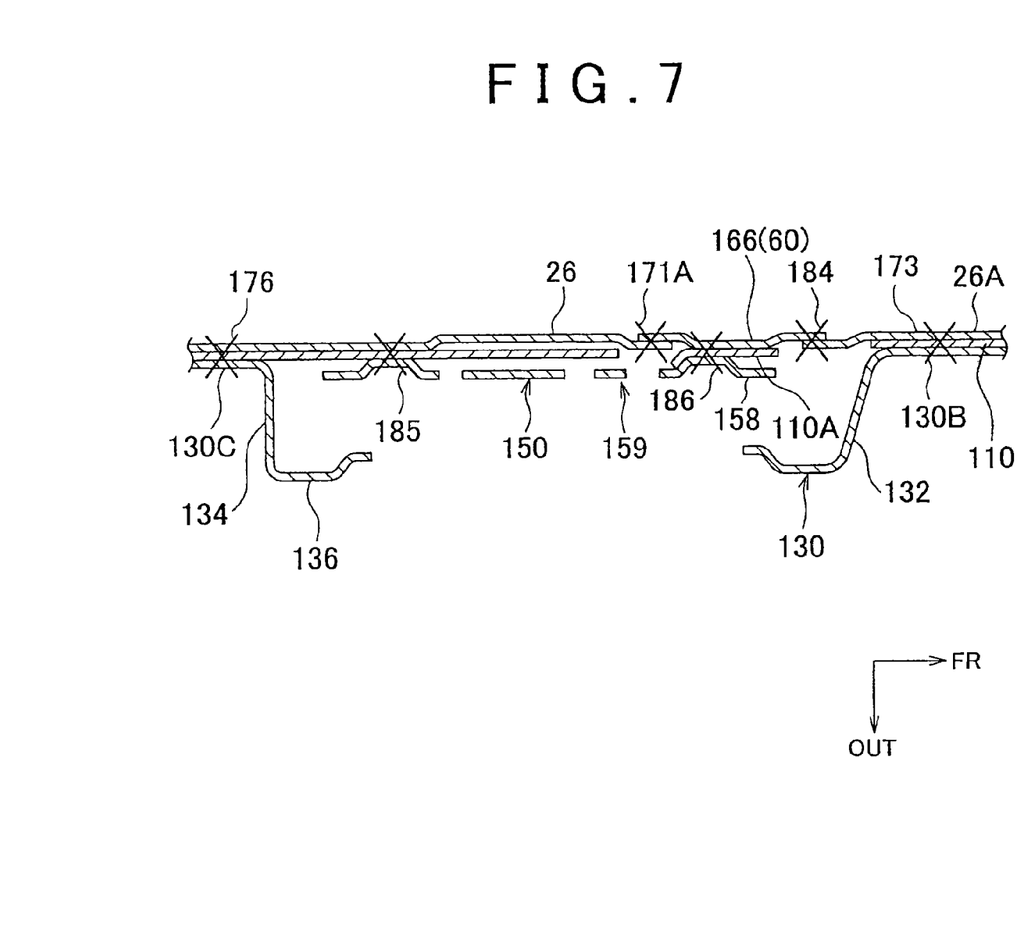
FIG. 7 is a cross-sectional view that is taken along the line VII-VII of FIG. 3.

As shown in FIG. 7, the upper wall portion 64 of the strainer front 60, which constitutes the upper back cross-sectional portion 160, has a flange 166 that extends from an outer end portion thereof in a vehicle width direction toward the top of the vehicle and is joined to the extended portion 26 by spot welding at a welding point 184.

The inner coupling portion 158 has a rear portion which is joined to the extended portion 26 and the roof side inner 110 by spot welding at a welding point 185. The welding point 185 is located between a welding point 186, which is described later, and the welding point 176. The roof side inner 110 may have an opening, such as a notch or hole, and a rear portion of the inner coupling portion 158 may be joined only to the extended portion 26 through the opening. The rear portion of the inner coupling portion 158 may be joined only to the roof side inner 110.

As shown in FIG. 6 and FIG. 7, the inner coupling portion 158 has an opening 159, which is a notch that is formed by cutting it from the vehicle bottom side, and a welding point 171A at which the flange 166 of the upper back cross-sectional portion 160 and the extended portion 26 are joined by spot welding is formed by joining them by spot welding through the opening 159. While the opening 159 is a notch in this embodiment, the opening 159 may be a through hole that extends in a thickness direction of the inner coupling portion 158 (vehicle width direction). A plurality of welding points 171A may be formed.

The flange 166, which is formed at an outer end portion of the upper wall portion 64 of the strainer front 60 in a vehicle width direction, is joined to a front portion of the inner coupling portion 158 and the roof side inner 110 by spot welding at a welding point 186. The welding point 186 is one example of the "junction where a bulk and an upper back cross-sectional portion are joined" in the present invention, and is located between the front end portion 130B and the rear end portion 130C of the roof side outer 130 as shown in FIG. 2.

The rear wall portion 72 of the strainer rear 70, which constitutes the upper back cross-sectional portion 160, has a flange 168 that extends from an outer end portion thereof in a vehicle width direction toward the rear of the vehicle, and the flange 168 has an upper portion which is joined to the front end portion 100A of the bracket package tray 100 by spot welding, and a lower portion which is joined to the extended portion 26 by spot welding at a welding point 187.

Figure 8:
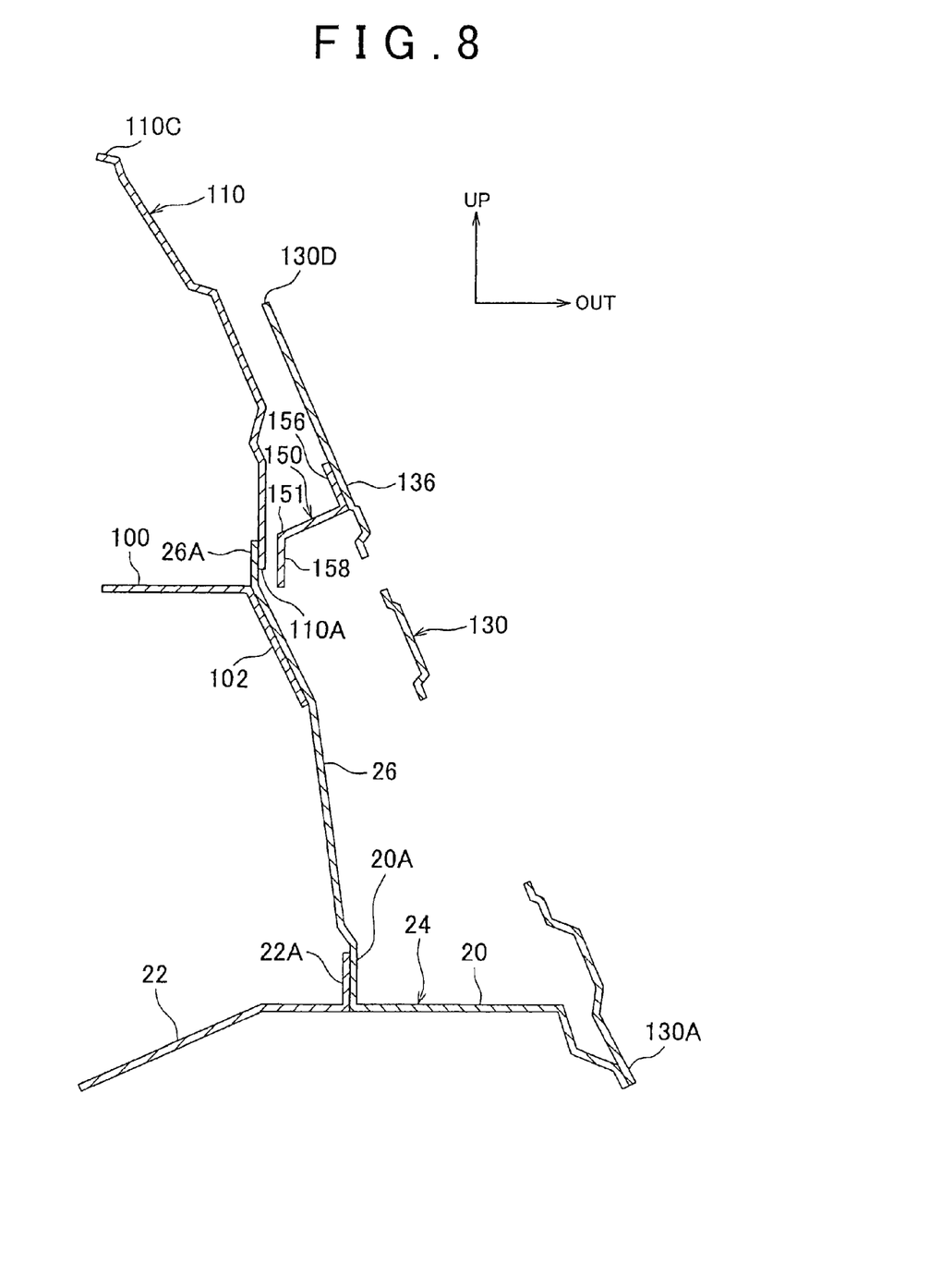
FIG. 8 is a cross-sectional view that is taken along the line VIII-VIII of FIG. 3.

As shown in FIG. 8, the roof side outer 130 has an upper end portion 130D that is located on the vehicle bottom side compared to an upper end portion 110C of the roof side inner 110. The upper end portion 130D of the roof side outer 130 is separated outward in a vehicle width direction from the roof side inner 110 and is not joined to the upper end portion 110C of the roof side inner 110.

The functions and effects of the embodiment of the present invention are next described. A comparative example is first described in order to clarify the functions and effects of the embodiment of the present invention more fully.

Figure 10:
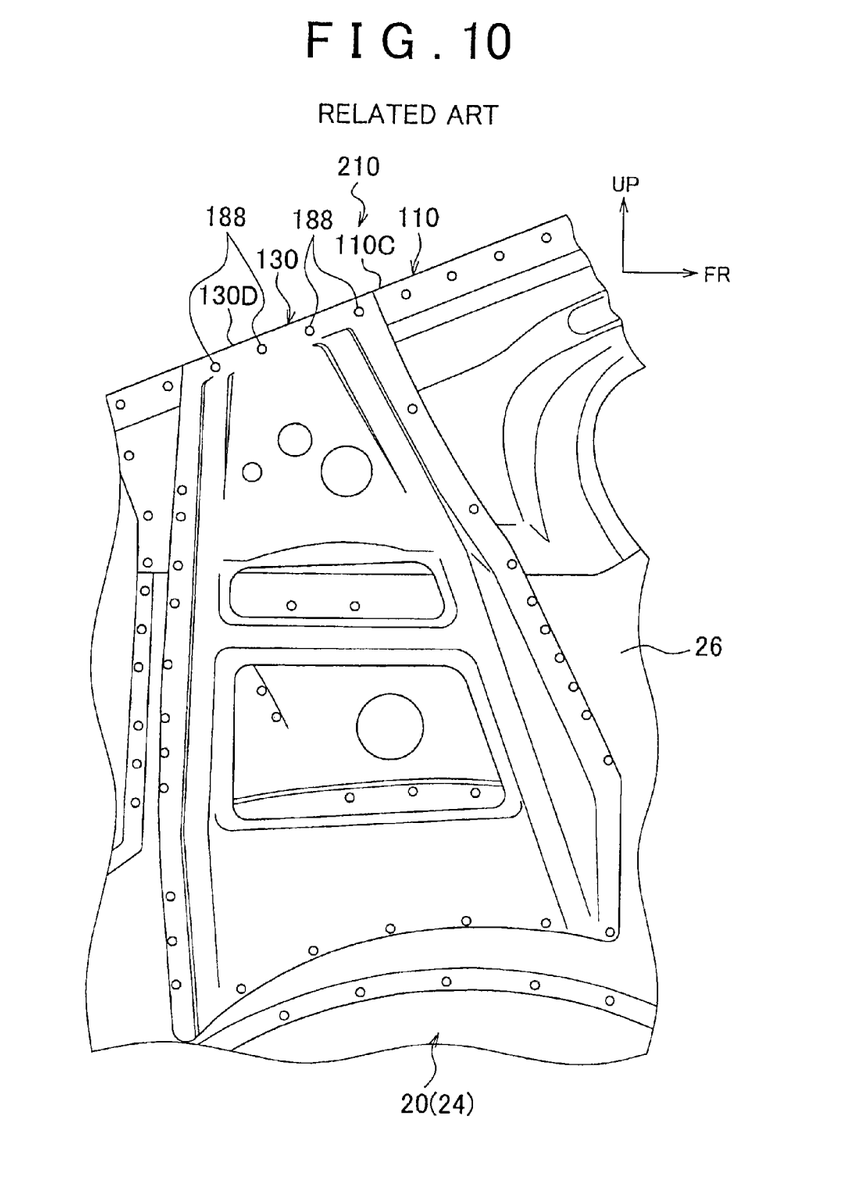
FIG. 10 is a diagram of a vehicle body rear structure according to a comparative example as seen from outside in a vehicle width direction for comparison to the embodiment of the present invention.

A vehicle body rear structure 210 according to a comparative example that is shown in FIG. 10 is different in configuration from the vehicle body rear structure 10 according to the embodiment of the present invention as described below. In the comparative example, components with the same names as those of the components of the embodiment of the present invention are designated by the same reference numerals for the sake of convenience.

In the vehicle body rear structure 210 according to the comparative example is not provided with the bulk 150 (refer to FIG. 6 and so on). In addition, the upper end portion 130D of the roof side outer 130 extends further toward the top of the vehicle and is joined to the upper end portion 110C of the roof side inner 110 by spot welding at welding points 188.

However, in the vehicle body rear structure 210 according to the comparative example, when a load toward the top of the vehicle is transmitted from a suspension that supports a rear wheel to the suspension tower plate 30 and the vehicle body undergoes torsional deformation, the upper back cross-sectional portion 160 (refer to FIG. 1 for the above) is pulled inward in a vehicle width direction. Thus, the welding points 174, at which the roof side outer 130 and the upper back cross-sectional portion 160 are joined, and the welding point 177, at which the roof side outer 130 and the bracket package tray 100 are joined, may undergo deformation which tends to cause separation thereof.

Especially, when the vehicle body undergoes torsional deformation as described above, the roof side inner 110 undergoes torsional deformation which tends to displace the upper end portion 110C thereof outward in a vehicle width direction, and the upper end portion 130D of the roof side outer 130 is pulled toward the outside of the vehicle by the upper end portion 110C of the roof side inner, 110. Thus, the welding points 174 and 177 and welding points around the welding points 174 and 177 undergo large deformation which tends to cause separation thereof.

On the contrary, in the vehicle body rear structure 10 according to one embodiment of the present invention, which is shown in FIG. 1 to FIG. 8, the roof side outer 130 and the upper back cross-sectional portion 160 are coupled by the bulk 150. Thus, even when a load toward the top of the vehicle, is transmitted from a suspension that supports a rear wheel to the suspension tower plate 30 and the vehicle body undergoes torsional deformation, the upper back cross-sectional portion 160 is prevented from being pulled inward in a vehicle width direction. This prevents the welding points 174 and 177 and welding points around the welding points 174 and 177 from undergoing deformation which tends to cause separation thereof.

In addition, the roof side outer 130 and the flange 166 of the upper back cross-sectional portion 160 are directly coupled by the bulk 150. In addition, the roof side outer 130, the extended portion 26 and the roof side inner 110 are coupled by the bulk 150 at a location closer to the junction (the welding point 177) where the rear end portion 130C of the roof side outer 130 and the bracket package tray 100 are joined. This prevents the welding points 174 and 177 and welding points around the welding points 174 and 177 from undergoing deformation which tends to cause separation thereof more effectively.

When a load toward the top of the vehicle is transmitted from a suspension that supports a rear wheel to the suspension tower plate 30 and the vehicle body undergoes torsional deformation, a, shearing load acts on the welding point 181, at which the front wall portion 132 and the front coupling portion 152 are joined, and the welding point 182, at which the rear wall portion 134 and the rear coupling portion 154 are joined. Thus, the load which tends to cause separation of the welding points 174 and 177 and welding points around the welding points 174 and 177 can be reduced. This prevents the welding points 174 and 177 and welding points around the welding points 174 and 177 from undergoing deformation which tends to cause separation thereof more effectively.

In addition, the front coupling portion 152 and the rear coupling portion 154 extend in opposite directions along a vehicle height direction. Thus, the spot welding gun is prevented from interfering with the rear coupling portion 154 when the front wall portion 132 and the front coupling portion 152 are joined by spot welding, and the spot welding gun is prevented from interfering with the front coupling portion 152 when the rear wall portion 134 and the rear coupling portion 154 are joined by spot welding.

Similarly, the outer coupling portion 156 and the inner coupling portion 158 extend in opposite directions along a vehicle height direction. Thus, the spot welding gun is prevented from interfering with the inner coupling portion 158 when the connecting wall portion 136 and the outer coupling portion 156 are joined by spot welding, and the spot welding gun is prevented from interfering with the outer coupling portion 156 when the upper back cross-sectional portion 160, the extended portion 26 and the roof side inner 110 are joined to the inner coupling portion 158 by spot welding. This improves the work efficiency during the spot welding processes.

In addition, the number of welding points between the upper back cross-sectional portion 160 and the extended portion 26 is increased because the flange 166 of the upper back cross-sectional portion 160 and the extended portion 26 are joined by spot welding (because the welding point 171A is formed) through the opening 159 of the inner coupling portion 158. This improves the coupling strength between the upper back cross-sectional portion 160 and the extended portion 26.

In addition, the upper end portion 130D of the roof side outer 130 is located on the vehicle bottom side compared to the upper end portion 110C of the roof side inner 110, and is not joined to the upper end portion 110C of the roof side inner 110. Thus, when a load toward the top of the vehicle is transmitted from a suspension that supports a rear wheel to the suspension tower plate and the vehicle body undergoes torsional deformation and when the roof side inner 110 undergoes torsional deformation which tends to displace the upper end portion 110C thereof outward in a vehicle width direction, the torsional deformation of the roof side inner 110 is prevented from being transmitted to the upper back cross-sectional portion 160 via the roof side outer 130. This prevents the welding points 174 and 177 and welding points around the welding points 174 and 177 from undergoing deformation which tends to cause separation thereof more effectively.

Figure 9:
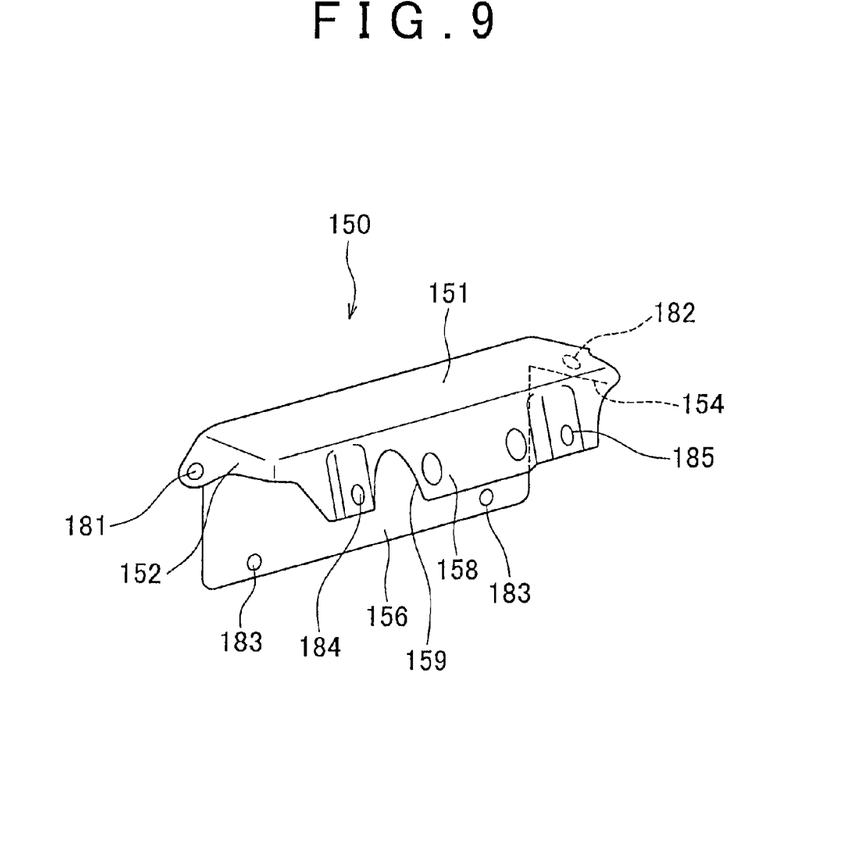
FIG. 9 is a perspective view that illustrates a modification of the bulk that is shown in FIG. 6.

The bulk 150 may be configured as shown in FIG. 9. In other words, in a modification that is shown in FIG. 9, the front coupling portion 152, the rear coupling portion 154, the outer coupling portion 156, and the inner coupling portion 158 all extend toward the bottom of the vehicle and are joined to each other to form an annular configuration. This configuration can improve the rigidity of the bulk 150 and allows reduction of the thickness of the bulk 150.

While one embodiment of the present invention is described in the foregoing, it should be appreciated that the present invention is not limited to the above description and may be implemented with various modifications without departing from the gist thereof.

Technical ideas that can be understood from the above embodiment in addition to the inventions that are described in claims are described below together with the effects thereof.

In other words, the vehicle body rear structure includes a wheel house which is located on one side in a rear of a vehicle and houses a rear wheel; a suspension tower plate which is coupled to the wheel house and supports an upper end portion of a suspension that supports the rear wheel; an upper back cross-sectional portion which is locates inside an extended portion that extends toward a top of the vehicle from the wheel house in a vehicle width direction and forms a skeleton that is elongated in a vehicle width direction; a bracket package tray which is located inside the extended portion in a vehicle width direction and on a vehicle rear side of the upper back cross-sectional portion and has a front end portion which is joined to the upper back cross-sectional portion; a roof side inner which is located on a vehicle top side of the extended portion and has a lower end portion which is joined to an upper end portion of the extended portion; a roof side outer which is located outside the extended portion and the roof side inner in a vehicle width direction and which has a lower end portion which is joined to the wheel house, a front end portion which is joined to the upper back cross-sectional portion and the roof side inner, a rear end portion which is joined to the bracket package tray and the roof side inner, and an upper end portion which is located on a vehicle bottom side compared to an upper end portion of the roof side inner and is not joined to the upper end portion of the roof side inner.

According to the vehicle body rear structure, the upper end portion of the roof side outer is located on the vehicle bottom side compared to the upper end portion of the roof side inner and is not joined to the upper end portion of the roof side inner. Thus, when a load toward the top of the vehicle is transmitted from a suspension that supports a rear wheel to the suspension tower and the vehicle body undergoes torsional deformation and when the roof side inner undergoes torsional deformation which tends to displace the upper end portion thereof outward in a vehicle width direction, the torsional deformation of the roof side inner is prevented from being transmitted to the upper back cross-sectional portion via the roof side outer. This prevents the junction between the roof side outer and the upper back cross-sectional portion and the junction between the roof side outer and the bracket package tray from undergoing deformation which tends to cause separation thereof.

The invention claimed is:

1. A vehicle body rear structure, comprising:
   a wheel house located on one side in a rear of a vehicle, the wheel house housing a rear wheel;
   a suspension tower plate coupled to the wheel house, the suspension tower plate supporting an upper end portion of a suspension, the suspension supporting the rear wheel;
   an upper back cross-sectional portion located inside an extended portion, the extended portion extending toward a top of the vehicle from the wheel house in a vehicle width direction, and the upper back cross-sectional portion providing a vehicle frame cross member that is elongated in a vehicle width direction;
   a bracket package tray located inside the extended portion in a vehicle width direction and on a vehicle rear side of the upper back cross-sectional portion, the bracket package tray having a front end portion joined to the upper back cross-sectional portion;
   a roof side inner located on a vehicle top side of the extended portion, the roof side inner having a lower end portion joined to an upper end portion of the extended portion;
   a roof side outer located outside the extended portion and the roof side inner in a vehicle width direction, the roof side outer having a lower end portion, a front end portion and a rear end portion, the lower end portion being joined to the wheel house, the front end portion being joined to the upper back cross-sectional portion, and the rear end portion being joined to the bracket package tray; and
   a connector coupling the roof side outer and the upper back cross-sectional portion.

2. The vehicle body rear structure according to claim 1, wherein the connector couples the roof side outer with at least one of the extended portion and the roof side inner at a location between a first junction and a second junction, the first junction being located between the front end portion and the rear end portion of the roof side outer, the connector and the upper back cross-sectional portion being joined at the first junction, and the rear end portion of the roof side outer and the bracket package tray being joined at the second junction.

3. The vehicle body rear structure according to claim 1, wherein the front end portion and the rear end portion of the roof side outer are joined to the roof side inner, and the roof side outer has an upper end portion which is located on a vehicle bottom side compared to an upper end portion of the roof side inner, the upper end portion of the roof side outer being not joined to the upper end portion of the roof side inner.

4. The vehicle body rear structure according to claim 1, wherein the roof side outer has a front wall portion, a rear wall portion and a connecting wall portion, the front wall portion and the rear wall portion being arranged in a vehicle length direction, and the connecting wall portion coupling the front wall portion and the rear wall portion.

5. The vehicle body rear structure according to claim 4, wherein the connector has a front coupling portion, a rear coupling portion, an outer coupling portion and an inner coupling portion, the front coupling portion being joined to the front wall portion, the rear coupling portion being joined to the rear wall portion, the outer coupling portion being joined to the connecting wall portion, the inner coupling portion having a front portion joined to the upper back cross-sectional portion and a rear portion joined to at least one of the extended portion and the roof side inner.

6. The vehicle body rear structure according to claim 5, wherein the front coupling portion and the rear coupling portion extend in opposite directions along a vehicle height direction.

7. The vehicle body rear structure according to claim 5, wherein the outer coupling portion and the inner coupling portion extend in opposite directions along a vehicle height direction.

8. The vehicle body rear structure according to claim 5, wherein the front coupling portion, the rear coupling portion, the outer coupling portion and the inner coupling portion all extend toward a bottom of the vehicle, and are joined to each other to provide an annular configuration.

9. The vehicle body rear structure according to claim 5, wherein the inner coupling portion has an opening, the opening being a notch or hole, and at least one of welding points at which the extended portion and the upper back cross-sectional portion are joined by spot welding is a welding point, the welding point being provided by spot welding through the opening.

* * * * *